United States Patent [19]
Jurkoic

[11] 3,762,631
[45] Oct. 2, 1973

[54] APPARATUS FACILITATING THE LOADING OF HORSES INTO TRAILERS

[76] Inventor: Joseph R. Jurkoic, 88 Ledge Rd., Berlin, Conn. 06037

[22] Filed: Feb. 10, 1972

[21] Appl. No.: 225,152

[52] U.S. Cl. .............................................. 231/2 R
[51] Int. Cl. ............................................. B68b 11/00
[58] Field of Search ......................... 119/151, 154; 294/18, 22; 231/2 R

[56] References Cited
UNITED STATES PATENTS
| | | | |
|---|---|---|---|
| 2,122,264 | 6/1938 | Porter | 119/154 |
| 2,603,185 | 7/1952 | Kuhns | 119/151 |
| 2,103,401 | 12/1937 | Bailey | 231/2 R |

Primary Examiner—Hugh R. Chamblee
Attorney—F. Eugene Davis, IV et al.

[57] ABSTRACT

A bifurcated frame having an elongated handle attached thereto loosely embraces the rump and hind quarters of a horse. The handle provides separation of a handler from the rearward kicking range of the horse, and also provides leverage in turning and guidng the horse embraced by the bifurcated frame, the apparatus thereby being useful in loading the horse into a trailer or other enclosure.

The legs of the bifurcated frame are preferably toed-in for better control of the horse. The separation of the legs is preferably adjustable for properly embracing horses of various sizes. The handle is preferably detachable from the bifurcated frame for compact storage.

10 Claims, 5 Drawing Figures

PATENTED OCT 2 1973 3,762,631
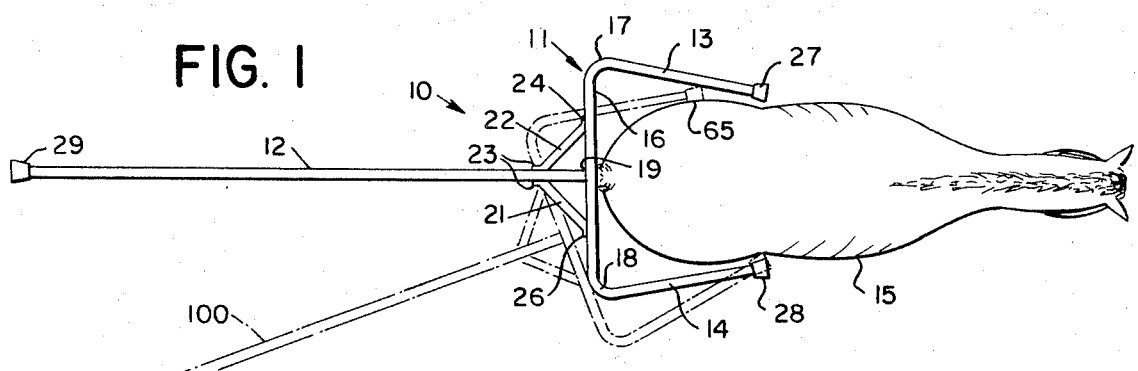
FIG. 1
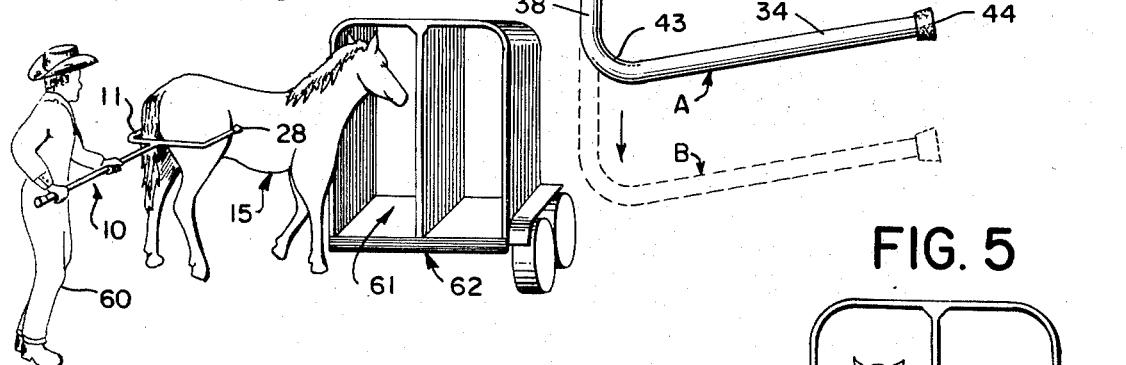
FIG. 2
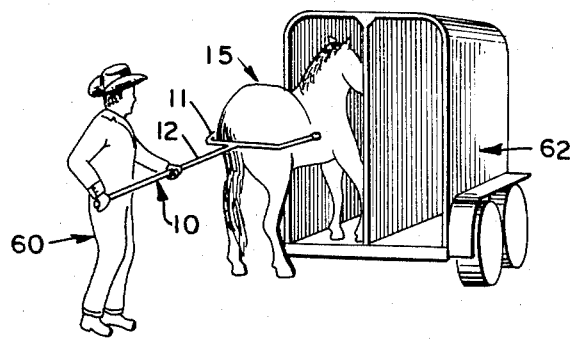
FIG. 3
FIG. 4
FIG. 5

APPARATUS FACILITATING THE LOADING OF HORSES INTO TRAILERS

BACKGROUND OF THE INVENTION

This invention relates to apparatus aiding the loading of animals into confined spaces, and more particularly relating to apparatus for loading horses into horse trailers.

Each year, thousands of horses are injured through conventional loading means. Some horses have been taught to enter generally confined horse-transporting conveyances, but the vast majority have not. For a horse not schooled in the procedure, entering a strange and confining vehicle can be a terrifying experience. The horse's natural tendency is to flee, and if this is not possible, then to fight. In such situations, accidents often happen which injure either the horse, the handler, or both.

Most current loading methods incorporate the use of a rope, with the "rump rope" being the most popular. This method of loading is accomplished by positioning the horse facing the trailer into which it is to be loaded with two handlers flanking the horse. A rope is passed around the horse's rump with each handler grasping one end of the rope. The two handlers pull forward on the rope urging the horse forward into the horse trailer. If the horse balks or fights, the handlers are exposed to danger. Their combined strength does not equal that of the horse, and they are very close to the horse's feet. They may be knocked down, kicked, stepped on, pinned between the trailer and the horse, or the like, and injured.

OBJECTS OF THE INVENTION

It is an object of the invention to provide an apparatus aiding in the safe and efficient loading of horses.

It is another object of the invention to provide an apparatus for loading horses wherein the handler is a safe distance from the horse.

It is a further object of the invention to provide and apparatus for loading horses which is humane.

It is an additional object of the invention to provide an apparatus for loading horses wherein the apparatus compensates for the greater strength of the horse.

It is another object of the invention to provide an apparatus for loading horses which is adjustable to accommodate horses of various sizes as well as other similar animals.

It is a still further object of the invention to provide an apparatus for loading horses which is durable, inexpensive, and easily stored.

Other objects of the invention will in part be obvious and will in part appear hereinafter.

The invention accordingly comprises the features or construction, combinations of elements, and arrangement of parts which will be exemplified in the constructions hereinafter set forth, and the scope of the invention will be indicated in the claims.

THE DRAWINGS

For a fuller understanding of the nature and objects of the invention, reference should be had to the following detailed description taken in connection with the accompanying drawings in which:

FIG. 1 is a top view of the horse loading apparatus loosely embracing the hind quarters and rump of a horse.

FIG. 2 is a top plan view of a similar adjustable and disassembled horse loading apparatus according to the invention.

FIG. 3 is a perspective view of a handler preparing to load a horse into a horse trailer using the horse loading apparatus.

FIG. 4 is a persepctive view of a handler having partially loaded a horse into a horse trailer using the horse loading apparatus.

FIG. 5 is a perspective view of a horse completely loaded into a horse trailer and temporarily restrained therein by the horse loading apparatus.

The same numbers refer to the same elements throughout the drawings.

DETAILED DESCRIPTION

Referring first to FIG. 1, a horse loading apparatus 10 according to the invention generally comprises a bifurcated horse-embracing frame portion 11 and a rearwardly extending handle 12. The bifurcated horse-embracing frame portion 11 comprises two forwardly protruding legs 13 and 14 which are interconnected by a transverse bar 16. The two legs 13 and 14 are preferably toed-in, as shown in FIG. 1, wherein greater control of horse 15 is achieved, as will be described more fully hereinafter.

The transverse bar 16 and the legs 13 and 14 may be formed of one tubular member appropriately bent at 17 and 18. The rearwardly extending handle portion 12 may also be a tubular member having one end welded to the transverse bar 16 at 19. Two braces 21 and 22 are welded to the handle 12 at 23 and to the transverse bar 16 at 24 and 26, thereby strengthening the handle-bifurcated frame structure. Rubber tips 27 and 28 shield the ends of legs 13 and 14, the rubber tip 29 shields the end of the handle 12.

Details of a similar adjustable horse loading apparatus 10a can be seen in FIG. 2. It generally comprises an adjustable bifurcated frame portion 30 and a removably attached handle portion 32. The bifurcated frame portion 30 comprises two legs 33 and 34 interconnected by a transverse bar 36. The transverse bar 36 is formed in two sections 37 and 38, section 37 being comprised of hollow tubing having an inside diameter large enough to accept section 38 in telescoping engagement, wherein sliding width adjustment of the transverse bar 36 is accomplished. Section 38 has a plurality of holes formed therein, such as holes 39 and 40, which are alignable with a hole 41 formed in section 37. A pin is passed through hole 41 and one of the holes in section 38 to retain section 38 at the desired width adjustment and to prevent rotation of section 38 with respect to section 37. Width adjustment may be accomplished in steps between position A of legs 34 (shown in solid lines) and position B of leg 34 (shown in dotted lines) by providing appropriate holes in section 38.

The leg 33 and section 37 of the transverse bar 36 are formed of one tubular member appropriately bent at 42, and leg 34 and section 38 of the transverse bar 36 are also formed of one tubular member appropriately bent at 43. Two rubber tips 44 are positioned on the ends of legs 33 and 34 for protecting the flanks of horse 15 from any sharp edges on the ends of the legs.

Referring still to FIG. 2, the bifurcated frame portion 30 of the horse loading apparatus 10a further comprises a mounting socket 45 for the rearwardly extending handle 32. Accordingly, a short hollow tubular member 46 is welded to the outside section 37 of transverse bar 36 at 47. A first brace 48 is attached to the tubular member 46 at 49 and to section 37 of the transverse bar 36 at 50, and a similar brace 51 is attached to tubular member 46 at 52 and to section 37 at 53. The braces 48 and 51 cooperate with the weld at 47 to better secure tubular member 46.

The tubular member 46 is sufficiently large to receive the end of handle 32 in telescoping engagement therewith, and the handle 32 is held in tubular member 46 by passing a pin through hole 54 formed in the handle 32 and hole 55 formed in the tubular member, the two holes being aligned when the handle is inserted.

The horse loading apparatus 10a is more easily stored because the handle portion 32 is removable, and the bifurcated frame portion can also be disassembled to provide a more compact storage size of the apparatus.

Referring now to FIG. 3 there is shown a handler 60 using the horse loading apparatus 10 in loading a horse 15 into a stall 61 of a horse trailer 62. The bifurcated frame portion 11 of the horse loading apparatus 10 is positioned to embrace the hind quarters of horse 15, and the handler manipulates the bifurcated frame portion by means of the handle 12. In FIG. 3 the handler 60 is shown moving the hind quarters of horse 15 to the left by prodding the right flank of the horse with the rubber-tipped end of leg 14.

A top view of the orientation of the horse loading apparatus 10 with respect to the horse 15 corresponding to FIG. 3 is shown by the dotted lines 100 of FIG. 1. It is also apparent from FIG. 1 that the handler 60 has a leverage advantage, the leg 13 being firmly positioned against the horse 15 at 65 wherein further rotation of the handle 100 causes rubber tip 28 to dig into the horses right flank. Turning the horse by means of prodding its flanks permits the handler to "aim" the horse into the desired enclosure, for instance stall 61 of horse trailer 62.

Referring now to FIG. 4 the horse has been partially loaded into stall 61, and the handler is using the horse loading apparatus 10 to push horse 15 forward and to guide the rear quarters of the horse. Also best seen in FIG. 4 is the separation the handle 12 provides between the handler and the rear of the horse, wherein the handler is "out of range" of the horses hind legs. Therefore, if the horse kicks or balks at being loaded, the likelihood of injury to the handler is significantly reduced.

Referring ow to FIG. 5 the horse loading apparatus 10 is shown restraining the horse 15 in stall 61 of horse trailer 62. Again, the handler is separated a safe distance from the horses rear legs, wherein the handler can safely hold the horse in the stall until a tailgage (not shown) can be attached to the rear of the horse trailer.

The alternative, adjustable horse loading apparatus 10a is used in the same manner, and the bifurcated frame portion 30 thereof can be easily adjusted to properly embrace horses or other animals of varying size.

Th horse loading apparatus described herein is useful in handling animals other than horses. It may be useful to farmers in teaching cows to enter milking stalls, and it may be useful to zoo personnel in handling various zoo animals.

It will thus be seen tha the objects set forth above, among those made apparent from the preceding description, are efficiently attained and, since certain changes may be made in the above constructions without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent is:

1. Apparatus for handling horses and other large quadrupeds comprising:
   A. a bifurcated frame having a transverse bar interconnecting two forwardly protruding legs sufficiently spaced apart to engage the hindquarters of a horse while the transverse bar engages the rump thereof; and
   B. an elongaged handle attached to the bifurcated frame and extending rearwardly therefrom.

2. Apparatus for handling horses and other large quadrupeds as defined in claim 1, wherein the forwardly protruding legs of the bifurcated frame and the rearwardly extending handle are positioned substantially in the same plane.

3. Apparatus for handling horses and other large quadrupeds as defined in claim 1 wherein the handle is attached to the bifurcated frame at the center of the transverse bar.

4. Apparatus for handling horses and other large quadrupeds as defined in claim 1 wherin the rearwardly extending handle is removably attached to the bifurcated frame portion and further comprising:
   C. a hollow member mounted at one end to the transverse bar of the bifurcated frame and protruding rearwardly therefrom, the interior of the hollow member being shaped to conform to the exterior of the forward end of the handle wherein the hollow member forms a socket for receiving the forward end of the handle in telescoping engagement; and
   D. means for retaining the handle in the socket and securing the handle against rotation therein.

5. Apparatus for handling horses and other large quadrupeds as defined in claim 1 wherein the forwardly protruding legs of bifurcated frame are toed-in.

6. Apparatus for handling horses and other large quadrupeds as defined in claim 1 wherein the length of the handle is greater than the kicking range of the quadruped being handled.

7. Apparatus of the class described comprising:
   A. a bifurcated frame having a transverse bar interconnecting two forwardly protruding legs comprising:
      1. a first transverse portion connected to one of the forwardly protruding legs;
      2. a second hollow transverse portion connection to the second forwardly protruding leg, the first portion being receivable in telescoping engagement in the second portion for sliding width-adjusting movement; and
      3. means for retaining said first and second transverse portions at a desired width adjustment;
   whereby the separation of the two forwardly protruding legs is adjustable to accommodate the hindquarters of four legged animals of varying sizes; and B. an elongated handle attached to the bifurcated frame and extending rearwardly therefrom.

8. Apparatus as defined in claim 7 further comprising:

4. means for securing said first and second portions of said bifurcated frame against relative rotation.

9. Apparatus as defined in claim 7 wherein the rearwardly extending handle is removably attached to the bifurcated frame portion and further comprising:

C. a hollow member mounted at one end to the transverse bar of the bifurcated frame and protruding rearwardly therefrom, the interior of the hollow member being shaped to conform to the exterior of the forward end of the handle wherein the hollow member forms a socket for receiving the forward end of the handle in telescoping engagement; and D. means for retaining the handle in the socket and securing the handle against rotation therein.

10. Apparatus as defined in claim 9 further comprising:

4. means for securing said first and said second portions of said bifurcated frame against relative rotation.

* * * * *